United States Patent
Litecky et al.

(10) Patent No.: US 7,530,278 B2
(45) Date of Patent: May 12, 2009

(54) FLUID FLOW BLENDER AND METHODS

(75) Inventors: Mark Daniel Litecky, Minneapolis, MN (US); Grant Bradley Edwards, Minneapolis, MN (US); Dennis John Smith, Minneapolis, MN (US); John Allan Kielb, Eden Prairie, MN (US)

(73) Assignee: RivaTek, Inc., St. Louis Park, MN (US)

( * ) Notice: Subject to any disclaimer, the term of this patent is extended or adjusted under 35 U.S.C. 154(b) by 88 days.

(21) Appl. No.: 11/592,495

(22) Filed: Nov. 2, 2006

(65) Prior Publication Data

US 2008/0105317 A1     May 8, 2008

(51) Int. Cl.
   *G01F 1/22*   (2006.01)
(52) U.S. Cl. .................................. 73/861.53
(58) Field of Classification Search ............. 73/861.53, 73/863.02, 23.37, 38; 137/12
   See application file for complete search history.

(56) References Cited

U.S. PATENT DOCUMENTS

| | | | |
|---|---|---|---|
| 1,098,247 A | 5/1914 | Gibbs | |
| 1,580,678 A | 4/1926 | Roučka | |
| 1,946,319 A | 2/1934 | Hodgson et al. | |
| 2,675,020 A | 4/1954 | Breitwieser | |
| 2,863,318 A | 12/1958 | Schroder | |
| 2,918,933 A | 12/1959 | Boitnott | |
| 3,055,389 A | 9/1962 | Brunner | |
| 3,685,786 A | 8/1972 | Woodson | |
| 3,724,503 A | 4/1973 | Cooke | |
| 3,930,518 A | 1/1976 | Fuller et al. | |
| 4,149,254 A | 4/1979 | Molusis | |
| 4,198,854 A * | 4/1980 | Washington et al. ........... | 73/38 |
| 4,406,161 A | 9/1983 | Locke et al. | |
| 4,484,479 A | 11/1984 | Eckhardt | |
| 4,651,572 A | 3/1987 | Albertz et al. | |
| 4,825,747 A | 5/1989 | Bardin et al. | |
| 4,993,269 A | 2/1991 | Guillaume et al. | |
| 5,190,068 A | 3/1993 | Philbin | |
| 5,251,148 A | 10/1993 | Haines et al. | |
| 5,326,468 A | 7/1994 | Cox | |
| 5,331,995 A | 7/1994 | Westfall et al. | |

(Continued)

FOREIGN PATENT DOCUMENTS

DE     37 13 542 A1     10/1987

(Continued)

OTHER PUBLICATIONS

Measurement and Modeling of the Flow Characteristics of Micro Disc Valves; J. A. Carretero, Massachusettes Institute of Technology; K.S. Breuer, Brown University; 8 pages; presented at a conference in Nov. 2000.

*Primary Examiner*—Jewel V Thompson
(74) *Attorney, Agent, or Firm*—Merchant & Gould PC

(57) ABSTRACT

A flow blender device that includes a plurality of input flow conduits and a single output flow conduit. A variable sized orifice is positioned along at least one of the conduits for metering and controlling fluid flowing through the flow blender device. The variable sized orifice can be positioned along any of the input or output flow conduits. The flow blender device can use differential pressure measurements across the variable sized orifices to determine fluid flow rates in the flow blender device.

23 Claims, 13 Drawing Sheets

U.S. PATENT DOCUMENTS

| | | | |
|---|---|---|---|
| 5,487,405 A | 1/1996 | Skoglund | |
| 5,576,498 A | 11/1996 | Shambayati | |
| 5,622,204 A | 4/1997 | Skoglund | |
| 5,672,832 A | 9/1997 | Cucci et al. | |
| 5,693,887 A | 12/1997 | Englund et al. | |
| 5,782,260 A | 7/1998 | Jacobs et al. | |
| 5,869,766 A | 2/1999 | Cucci et al. | |
| 5,962,774 A * | 10/1999 | Mowry et al. | 73/23.37 |
| 6,152,168 A | 11/2000 | Ohmi et al. | |
| 6,339,963 B1 | 1/2002 | Torkildsen | |
| 6,392,524 B1 * | 5/2002 | Biegelsen et al. | 336/200 |
| 6,422,256 B1 | 7/2002 | Ralazy et al. | |
| 6,463,810 B1 | 10/2002 | Liu | |
| 6,539,315 B1 | 3/2003 | Adams et al. | |
| 6,561,207 B2 | 5/2003 | Lowery et al. | |
| 6,564,824 B2 | 5/2003 | Lowery et al. | |
| 6,578,435 B2 | 6/2003 | Gould et al. | |
| 7,082,842 B2 | 8/2006 | Kielb et al. | |
| 7,096,744 B2 | 8/2006 | Kielb et al. | |
| 7,131,451 B2 | 11/2006 | Nugent et al. | |
| 2005/0051215 A1 | 3/2005 | Nugent et al. | |

FOREIGN PATENT DOCUMENTS

| | | |
|---|---|---|
| EP | 0 565 485 A1 | 10/1993 |
| EP | 0 767 895 B1 | 1/1999 |
| JP | 8-136306 | 5/1996 |
| JP | 11117915 | 4/1999 |

* cited by examiner

FLUID FLOW BLENDER AND METHODS

BACKGROUND

1. Technical Field

The present invention generally relates to fluid flow metering and control devices, and more particularly relates to flow blender devices for metering and controlling multiple fluid flows.

2. Related Art

There is a wide variety of production processes that require the blending or mixing of two or more fluids to form a "blended fluid". Some examples of this are the production of paints and fragrances, where a base fluid is blended with highly concentrated color or fragrance fluids. Another example is chemical processing, where de-ionized water can be mixed with a concentrated chemical to create the correct dilution of the chemical for an upcoming production process. FIG. 16 shows a block diagram of a system which combines or blends three fluids into one fluid. The system of FIG. 16 includes fluid inputs $I_{1-3}$, valves $V_{1-3}$, and flow meters $FM_{1-3}$. The resulting output $O_1$ of the system shown in FIG. 16 is a blended fluid.

Users will often build fluid blending systems using discrete components such as those shown in FIG. 16. The blending ratios are typically controlled by individually adjusting the valves $V_{1-3}$ to get the correct flow rates through each of the flow meters $FM_{1-3}$. In a more automated system, a host computer monitors the output of the flow meters $FM_{1-3}$ and adjust the valves $V_{1-3}$ to get the desired flow rates for each fluid, and hence the desired blend in the output $O_1$. The computer monitors the flow meters $F_{m1-3}$ via an analog output signal such as 4-20 mA, or via a digital communications signal such as a CAN bus signal using a protocol such as DeviceNet. The computer controls the valve openings via an electric or pneumatic control signal.

FIG. 17 shows another block diagram of an example control system for the fluid blending device shown in FIG. 16. In the system of FIG. 17, flow controllers $C_{1-3}$ each include one of the control valves $V_{1-3}$, flow meters $FM_{1-3}$, and a control algorithm. The flow set points $F_{sp1-3}$ for each of the flow controllers can be received by the controllers $C_{1-3}$ via an analog, digital or manual input signal. If the system is automated, the set points $F_{sp1-3}$ can be provided by a host computer. The percentage volume of each of the fluids in the final fluid is controlled by individually adjusting the flow rates of each valve and flow meter using the individual controllers $C_{1-3}$. If the total flow rate needs to be adjusted and the blend kept the same, each flow controller must have its set point changed by the same percentage.

Users commonly build their own customized fluid blending systems using discrete components such as those shown in FIG. 16. Building such a fluid blending system typically requires the user to study, identify, procure, and maintain spare parts for the correct valves and flow meters for the system. The blending ratio and total flow rate for the system may be controlled by manually adjusting the valves $V_{1-3}$ to obtain the correct flow rates through flow meters $FM_{1-3}$. Manually adjusting the valves can be a tedious and time consuming process depending upon the method used to determine whether the valves are set correctly. The user may also tend to leave the valves where the valves are set rather than make small adjustments to the valves to optimize the process because it is usually time consuming to reset the valves. In a more automated system, a host computer monitors the output of the flow meters $FM_{1-3}$ via an analog output signal such as 4-20 mA, or via a digital communications signal using a physical layer such as the CAN bus and a protocol such as DeviceNet. This type of setup requires the customer to develop and implement software to monitor the flow meters continuously, and to calculate the blend ratio and total flow rate. The user's software must also continuously adjust the valves to maintain the desired blend ratio and total flow rate via an electric or pneumatic control signal. Therefore, the user's software must spend a significant amount of time performing these low level monitoring, calculating, and adjusting tasks.

A flow device that addresses these and other shortcomings of known flow control and metering devices would be an important advance in the art.

SUMMARY

The present disclosure generally relates to fluid flow metering and control devices, and more particularly relates to fluid blending devices that include at least one variable-sized orifice, and related methods of metering and controlling multiple fluid flows in a fluid blending device. The example flow blender devices typically include a plurality of input flow conduits and a single output flow conduit. A variable sized orifice is positioned along at least one of the conduits for metering and controlling fluid flowing through the flow blender device. The variable sized orifice can be positioned along any of the input or output flow conduits. In some examples, multiple variable sized orifices can be used. For example, a variable sized orifice can be positioned along each one of the plurality of input flow conduits. In another example, a variable sized orifice is positioned along at least one of the input flow conduits and the output flow conduit. The flow blender devices can use differential pressure measurements across the variable sized orifices to determine fluid flow rates in the flow blender device. Temperature sensors and controllers can also be used as part of the example flow blender devices for determining and controlling the flow rates in the device.

The variable sized orifices typically include a movable element that is movable in a direction transverse to the direction of fluid flowing in the conduit into which the movable element extends. Position sensors can be used to determine a position of the movable element for purposes of metering and controlling fluid flow in the flow blender device.

The above summary is not intended to describe each disclosed embodiment or every implementation of the inventive aspects disclosed herein. Figures in the detailed description that follow more particularly describe features that are examples of how certain inventive aspects may be practiced. While certain embodiments are illustrated and described, it will be appreciated that the invention/inventions of the disclosure are not limited to such embodiments.

BRIEF DESCRIPTION OF THE DRAWINGS

The illustrative embodiments may best be described by reference to the accompanying drawings where.

Figure 1:
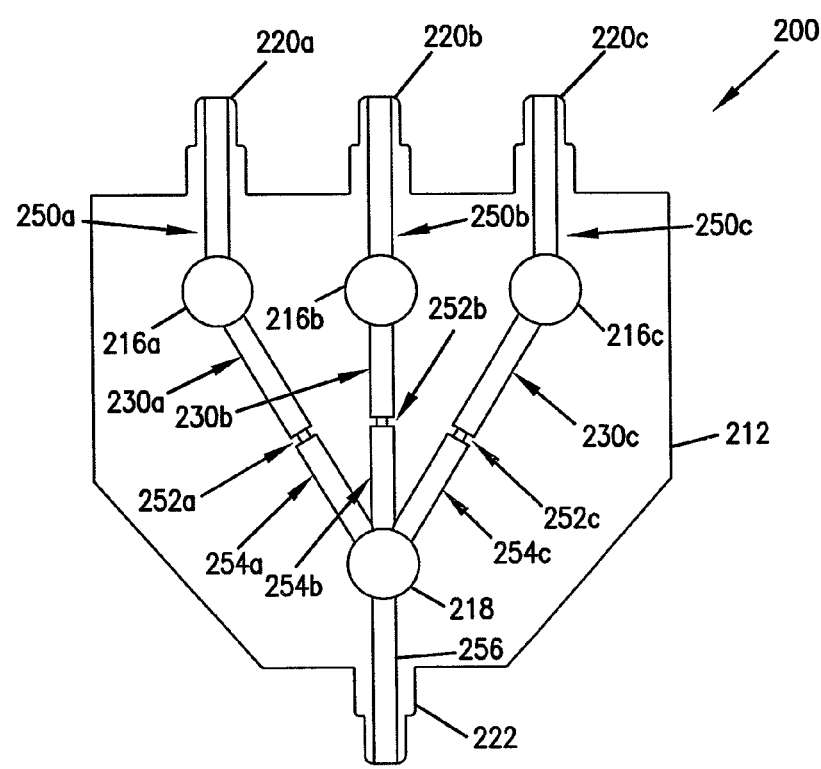
FIG. 1 is a schematic top view of an example flow blender in accordance with the present disclosure having multiple variable orifice valves.

While the inventive aspects of the present disclosure are amenable to various modifications and alternate forms, specific embodiments thereof have been shown by way of examples in the drawings, and will be described in detail. It should be understood, however, that the intention is not to limit the inventive aspects to the particular embodiments described. On the contrary, the intention is to cover all modifications, equivalents, and alternatives falling within the spirit and scope of the inventive aspects.

DETAILED DESCRIPTION

The present disclosure generally relates to fluid flow metering and control devices, and more particularly relates to fluid blending devices that include at least one variable-sized orifice, and related methods of metering and controlling multiple fluid flows in a fluid blending device. The variable-sized orifices can be particularly suited for use in differential pressure type flow blending devices as will be described herein with reference to the several drawings. However, the illustrated examples are only exemplary of the many different types of flow blending devices to which principles of the present disclosure may be applied.

Flow blender devices typically include at least two fluid inlets coupled in fluid communication within a housing of the device to corresponding inlet fluid conduits. At least one of the inlet fluid conduits includes a variable sized orifice positioned along a length of the conduit. The inlet fluid conduits are in fluid communication with an outlet fluid conduit. Fluids flowing in the outlet fluid conduit are blended together. A blending structure can be positioned in the outlet fluid conduit or downstream of the outlet fluid conduit to improve blending of the fluids. An additional variable sized orifice can be positioned in the outlet fluid conduit for further metering and controlling flow through the flow blender device. Pressure sensors are exposed to fluid flowing in the flow blender device, and are typically positioned on opposing upstream and downstream sides of the variable sized orifice to obtain a pressure differential measurement across the variable sized orifice.

A stand alone fluid flow blender, such as the device described below with reference to FIG. 1, simplifies and improves a typical blending process. A user need only maintain spare parts for and procure an integrated flow blender for the user's process. Dealing with an integrated component flow blender device as opposed to the multiple component device described in the Background section above can have many advantages. The installation and set up of a single fluid blender is much simpler than installing a multiple component blending configuration. An integrated flow blender typically has fewer maintenance issues due to the reduced number of components and fluid couplers required. The host computer system for an integrated flow blender should have improved bandwidth and have more time to spend on higher level tasks because the flow monitoring, calculation and control tasks are now handled onboard the fluid blender by the integrated flow blender controller. The user can also have increased opportunities to improve the performance of the process due to the ease and simplicity of adjusting total flow rates and blend ratios with an integrated flow blender.

The term "blender" as used herein is defined as a device that mixes or combines several separate parts into an integrated whole. The term "fluid blender" or "flow blender" as used herein is defined as a device that blends at least two fluid inputs into an integrated output fluid flow. The term "variable orifice" as used herein is defined as an orifice that can vary in cross-sectional opening size.

I. General Background

In process control industries, it is common to use small diameter tubes to carry process fluids at low flow rates when small amounts of fluids are required for manufacturing processes. The tubes are almost always of a circular cross-section. Instruments used to measure a flow rate in the tubes must interface with a fluid flowing in the tube while minimizing disturbance to the fluid flow. To minimize disturbance to the fluid flow, the instrument typically includes a circular cross-section flow path and orifice to match the cross-section of the tubes. When using an instrument with a circular cross-section orifice, the diameter (d) of the orifice is used in determining the flow rate of the process fluid. An instrument with a rectangular cross-section orifice can also be used. The cross-sectional area of rectangular orifice must be converted into a hydraulic diameter as explained below. The flow rate for a flow meter instrument measuring a change in pressure across an orifice is defined by the following Equation 1:

$$Q = K \frac{\pi d^2}{4} \left( \frac{2\Delta P}{\rho} \right)^{\frac{1}{2}} \quad \text{Equation 1}$$

Where:
Q=volumetric flow rate
K=flow coefficient d=hydraulic diameter of the orifice
ΔP=differential pressure across the orifice
ρ=density of the fluid In this equation, flow coefficient (K) is specific to the shape of the orifice and flow conditions present. The hydraulic diameter of the orifice (d) is calculated from the height and width of the orifice ($H_o$ and $W_o$) if the orifice has a rectangular cross-section shape, and is the diameter of the orifice if the orifice has a circular cross-section shape. The hydraulic radius of a rectangular orifice is a function of area (A) and perimeter (P), otherwise known as the orifice geometry [Roberson and Crowe, 1993, equations 10.3, 10.35]:

$$\frac{r}{2} = \frac{A}{P} \qquad \text{Equation 2}$$

The hydraulic diameter (d), which is twice the radius, is then calculated from the orifice height and width:

$$d = 2\frac{H_o W_o}{H_o + W_o} \qquad \text{Equation 3}$$

Figure 18:
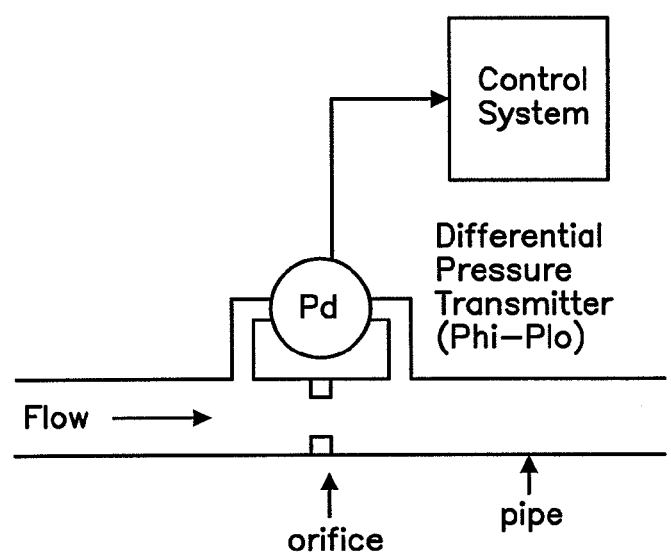
FIG. 18 is a schematic diagram illustrating an example pressure differential flow metering device.

The differential pressure measurement ($P_{hi}-P_{lo}$) could be made using two individual pressure measurements at locations upstream and downstream of the orifice and combining them to get the pressure difference or pressure drop. Alternatively, a single device as represented by the pressure device $P_d$ shown in FIG. 18 can be used to obtain the pressure differential measurement.

When orifices and differential pressure measurements are used to calculate flow through large pipes it is common for them to be discrete devices that are bolted or otherwise attached to the pipe through which the process fluid flows. There are also devices available for measuring the flow in small tubes that have the orifice and pressure sensors integrated into the same housing. In almost all cases, the measuring device orifices are of a fixed size for measuring flow over a fixed flow range. The flow characteristic (i.e., "flow coefficient" or "discharge coefficient") of the orifice is measured, or determined by design, by the manufacturer. For discrete systems, the end user can calculate the flow based upon the parameters in Equation 1, including a manufacturer provided discharge coefficient. In integrated systems, the discharge coefficient can simply be accounted for as part of a total device calibration performed by the manufacturer and maintains a constant value.

Differential pressure orifice flow metering is most accurate when the flow rate is near the upper end of the flow range that the meter is designed for; that is, where the pressure change is relatively large for a given change in flow rate. As the flow rate decreases, the accuracy of the device decreases because there is a relatively small pressure change for a given change in flow rate. This phenomenon can also be described as a decrease in the differential pressure to flow rate ratio. Since the pressure differential must be accurately known to calculate the flow rate, any error in the differential pressure measurement causes an error in the flow calculation. As the slope of the curve gets steeper at low flow rates on a graph plotting the ratio of differential pressure to flow rate, any pressure measurement error causes a larger flow calculation error.

In order to make more accurate flow measurements over a larger range of flow rates using an orifice and differential pressure measurement, it may be advantageous to use a variable-sized orifice. A variable-sized orifice can be used to improve the flow measurement accuracy over the range of orifice openings by providing a relatively high pressure differential for each flow rate. However, even though computational fluid dynamics (CFD) software can be used to optimize the design of a variable-sized orifice, there is still a small change in the discharge coefficient as the size of the orifice is varied. This change is due to the range of flows that the device is designed to measure, and the physical factors that contribute to the discharge coefficient of an orifice.

Some variable-sized orifice devices are designed to cover flow ranges that begin in the laminar flow region and end in the turbulent flow region, which make it likely that the discharge coefficient will vary in the different flow ranges. Also, it is known that the discharge coefficient of an orifice is comprised of a combination of physical effects relating to the fluid and the shape of the orifice. When the orifice is set for a very small opening, the surface area of the walls of the flow path are large relative to the cross-sectional area of the flow path. This is because a "slit" type opening results. In a slit type opening, the viscous force of the liquid against the walls in the orifice region of the flow path becomes much more significant than when a larger opening is present. A larger ratio of the wall surface area to the flow path cross-sectional area has the effect of lowering the discharge coefficient of the orifice.

Although a variable orifice flow meter may have the advantage of extending the range of a flow meter by as much as a factor of 10 or more, it may have the inherent drawback of decreased accuracy due to slight changes in the discharge coefficient at different openings, and for different flow rates at any given opening size.

In addition to the above noted disadvantages related to discharge coefficients, known variable orifice devices are ineffective for several other reasons. First, known variable orifice devices typically use circular or curved members that are moved with respect to the fluid flow to change the size of the orifice. Because of the curved nature of these members, the shape of the orifice changes as the size of the orifice changes, which results in significant errors when calculating the fluid flow over a range of orifice sizes. Second, the changed shape of the orifice leads to non-ideal orifice shapes for at least a portion of the flow range. This leads to inconsistent flow characteristics for any given opening as flow rate changes, again leading to errors in the calculation of fluid flow.

II. Flow Blender Devices Having Multiple Variable Sized Orifices

A. Example of FIGS. 1 and 2

Referring now to FIG. 1, an example flow blender device 200 is shown and described. Flow blender device 200 includes a housing 212, upstream pressure sensors 216*a-c*, a downstream pressure sensor 218, a plurality of inlet conduit connectors 220*a-c*, and an outlet conduit connector 222. A plurality of inlet conduits 230*a-c* within the housing 212 are in fluid communication with respective inlet conduit connectors 220*a-c* and an outlet conduit 256. Each of the inlet conduits 230*a-c* includes one of an upstream segments 250*a-c*, a variable sized orifice 252*a-c*, and a downstream segment 254*a-c*. A control system including a master controller for controlling each of the variable sized orifice 252*a-c* is associated with the flow blender device 200. An example control system is described below with reference to FIG. 5.

The flow blender device 200 is configured to measure the flow rate of each of the input fluids contained in the inlet conduits 230*a-c* using differential pressure measurements. The flow blender device 200 obtains a differential pressure reading across each of the variable sized orifices 252*a-c* by calculating a difference in the pressure measurements at the pressure sensors 216a-c and the pressure sensor 218. The sensors 216a-c and 218 can together be considered a pressure sensor assembly or pressure sensor arrangement.

The variable sized orifices 252a-c are defined by a reduced cross-sectional area portion of the conduits 230a-c, and a movable element that moves into the conduits 230a-c in a direction perpendicular to the direction of fluid flowing through the conduits 230a-c. An example variable sized orifice that can be used as any one of the orifices 252a-c is described below as orifice 64 with reference to FIGS. 6-13.

The variable sized orifices 252a-c create a pressure drop within the conduits 230a-c. The pressure drop is flow rate dependent. The variable sized orifices 252a-c also function to control the flow rate of each fluid flowing in the conduits 230a-c. Because the fluid output through the outlet conduit 256 is common for the fluids flowing through conduits 230a-c, only one pressure sensor 218 is required to make the downstream pressure measurement required to compute the pressure differential across each orifice 252a-c and ultimately the flow rate of each of the fluids in conduits 230a-c.

The single unit flow blender device 200 requires two fewer pressure sensors and associated circuitry than does, for example, the system described with reference to FIG. 16. Integrating the variable orifices 252a-c, the upstream pressure sensors 216a-c, the downstream pressure sensor 218, and the associated electronics for these features into a single housing 212 provides for a device that is significantly smaller than a comparable device that has three separate single flow controllers or three separate adjustable valves, and three separate flow meter features as required by, for example, the system described with reference to FIG. 15. Further consolidating the controllers for each of the pressure sensors and variable sized orifices into a single controller can also significantly reduce the number of components and size of the resulting flow blender device 200. Using variable sized orifices that function to both control and meter fluid flowing in the conduits 230a-c eliminates the need for separate valving and metering components (e.g., see FIG. 15). The reduced number of components and smaller size capabilities of the flow blender device 200 can result in both cost savings and space savings for the user.

Figure 2:
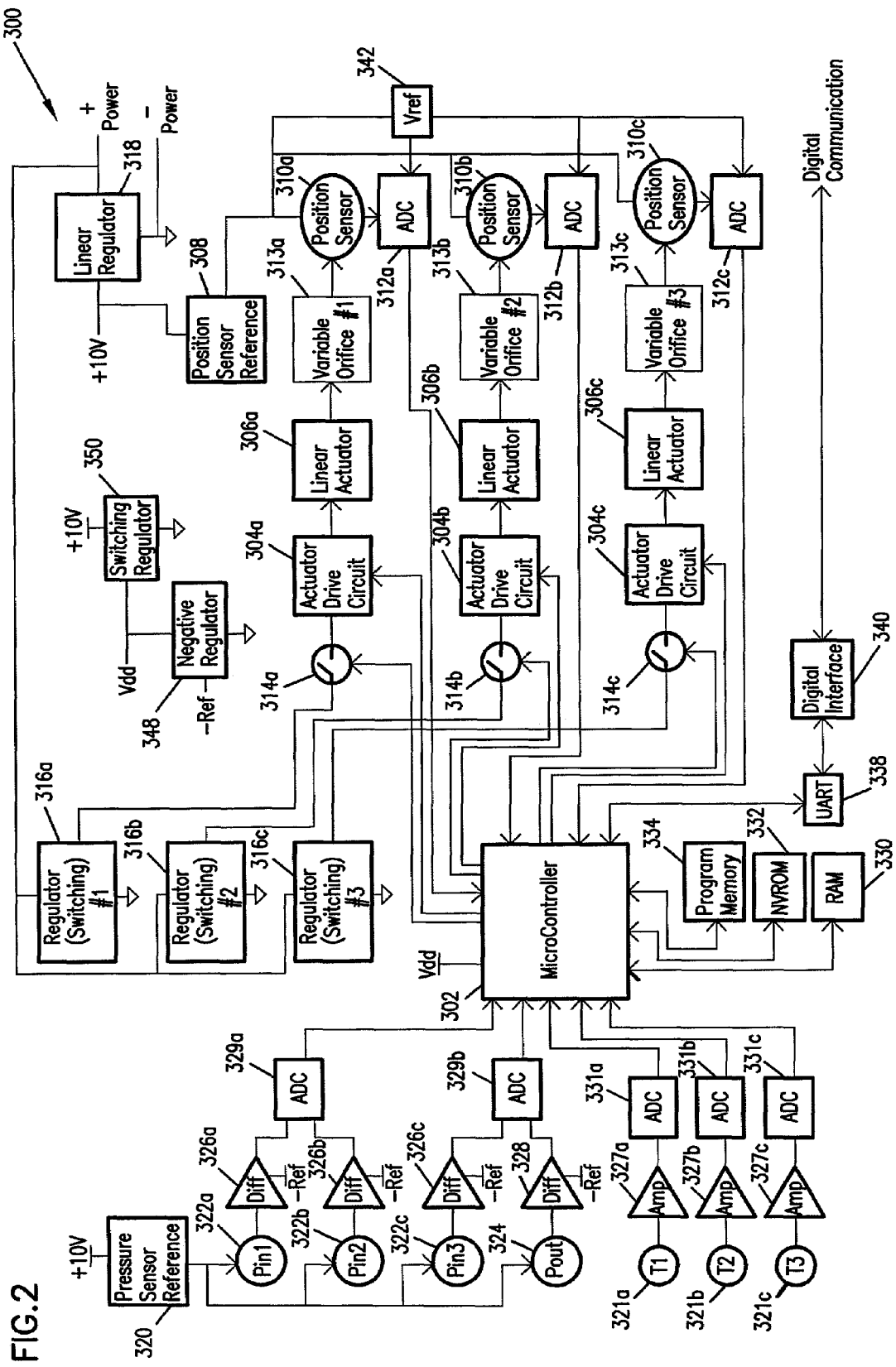
FIG. 2 is a schematic circuit diagram for the flow blender shown in FIG. 1.

Features of flow blender device 200 shown in FIG. 1 are shown schematically as part of a flow device assembly 300 in FIG. 2. Assembly 300 includes a microcontroller 302 that controls and communicates with most of the other assembly features. Assembly 300 includes actuator drive circuits 304a-c, linear actuators 306a-c, a position sensor reference 308, position sensors 310a-c, analog-to-digital converters (ADC) 312a-c, switches 314a-c, regulators 316a-c, and linear regulator 318 that relate to the flow device variable sized orifices 313a-c. Microprocessor 302 can be any suitable processor or controller such as, for example, the HD64F3062 32-bit microprocessor manufactured by RENESAS of San Jose, Calif.

The assembly 300 also includes a negative regulator 348, a switching regulator 350, a pressure sensor reference 320, input pressure sensors 322a-c, an output pressure sensor 324, difference amplifiers 326a-c, 328, and ADC's 329a-b that are used to determine a pressure differential across the variable sized orifices 313a-c. The assembly 300 also includes temperature sensors 321a-c, temperature amplifiers 327a-c, and related ADC's 331a-c that are used to determine a temperature of the fluid in the assembly 300. Different memory devices such as RAM 330, NVROM 332, and program memory 334 can be used by the microprocessor 302 to store data, such as, for example, instructions, code, and algorithms.

The microprocessor 302 receives digital inputs entered by an operator such as flow set points and blend ratios. The microprocessor 302 can communicate with direct digital signals through a UART (Universal Asynchronous Receiver/Transmitter) 338 and a digital interface 340. Microprocessor 302 can also generate output signals that are converted to analog signals having a magnitude of, for example, about 4 mA to about 20 mA. Assembly 300 can use a power source that includes a negative regulator 348 and the switching regulator 350 for powering various features of the assembly 300. In alternative arrangements, the microprocessor 302 can receive analog inputs in the form of, for example, current signals having a magnitude of about 4 mA to about 20 mA. The analog input signals can be converted to digital signals.

The assembly 300 requires a single microcontroller 302 that reads all of the pressure sensors 322a-c, 324, computes all of the flow rates, executes the control algorithms, and controls all of the linear actuators 306a-c. The same microcontroller 302 receives the total flow set point and a blend ratio inputs from the user via a digital interface 340 (e.g., DeviceNet digital protocol). As noted above, consolidation of the control features for a flow blender device into a single controller and associated components can result in space and cost savings as compared to a flow blender device that includes three separate controllers.

The flow blender device 200 is typically calibrated in a calibration process for a variety of flow rates and pressure conditions. The calibration information used by the microcontroller 302 for each of the pressure sensors 322a-c and 324, each orifice position sensor 310a-c, each temperature sensor 321a-c, and the flow calibration information for each variable sized orifice 313a-c is stored in non-volatile memory 332 or other memory features of the assembly 300. Microcontroller 302 receives the blend ratio input information (i.e., the percentage volume of each of the input fluids desired in the output fluid) along with the total flow rate set point (i.e., the desired flow rate for the output fluid) from the user, and monitors and controls the flow rate through each of the variable sized orifices 313a-c to achieve the desired outcomes. The microcontroller 302 interfaces with each variable sized orifice 313a-c and differential pressure sensor combination (322a, 324; 322b, 324; and 322c, 324) in a similar manner to the interface between the microcontroller, variable orifice and differential pressure sensors combinations for a single variable sized orifice device (described below with reference to FIGS. 6-14). Furthermore, the microcontroller 302 uses the same flow and control equations and similar calibration methods as does a single variable sized orifice flow device, as will be described below with reference to device 10 shown in FIGS. 6-14.

Typically, the flow blender device 200 is used only for controlling fluid flow. While each individual variable sized orifices 252a-c is calibrated for metering and controlling fluid flow through respective conduits 230a-c, the flow blending device 200 is not calibrated for metering and control of fluid flow through the combined flow output through the output conduit 256. The control system used to control flow blending device 200 typically uses an open loop circuit that sets the position of variable sized orifices 252a-c to produce a desired output flow rate having a specific blend ratio. However, there typically is no feedback information of the actual flow through the individual variable sized orifices 252a-c or the output conduit 256 to confirm the desired output flow rate and blend ratio has been attained.

B. Example of FIG. 3

Figure 3:
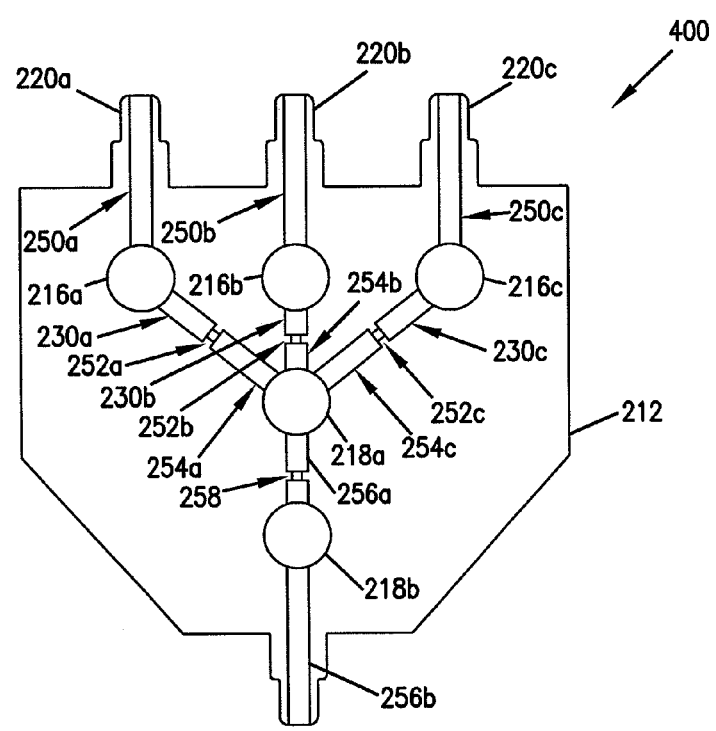
FIG. 3 is a schematic top view of another example flow blender in accordance with the present disclosure having multiple variable sized orifices and a downstream verification variable sized orifice.

FIG. 3 illustrates another example flow blender device 400 that includes many of the same features of device 200 described above, and further includes features for directly measuring and controlling an output flow of the device 400. Flow blender device 400 includes a fourth (outlet) variable sized orifice 258, and first and second downstream pressure sensors 218a-b. The sensors 216a-c and 218a, b can together be considered a pressure sensor assembly or pressure sensor arrangement. The outlet conduit of flow blender device 400 includes a first portion 256a, the outlet variable sized orifice 258, and a second portion or segment 256b. The outlet variable sized orifice 258 is positioned between the pressure sensors 218a, b, which makes possible a pressure differential measurement across the variable sized orifice 258. The controller (not shown) of the flow blender device 400 can use the pressure differential measurement between sensors 218a, b, and information about the size of the variable sized orifice 258 to obtain an outlet flow rate measurement. For flow blender device 400, the outlet variable sized orifice 258 is used only for metering fluid flow and not for controller flow rate through the outlet conduit segments 256a-b. Alternatively, the outlet variable sized orifice 258 can be used for controlling flow rate in addition to metering. Still further, the outlet variable sized orifice 258 can be used for controlling flow rate only and not for metering fluid flow.

The calculated flow rate using the outlet variable sized orifice 258 and the differential pressure reading from pressure sensors 218a-b functions as a redundant flow rate measurement in view of the summation of flow rate measurements taken across the variable sized orifices 252a-c. An advantage of having a redundant flow rate measurement for the total flow rate through leaving the flow blender device 400 is that there is improved reliability and accuracy of the output flow rate for the device 400. Another advantage of using the outlet variable sized orifice 258 is that the variable sized orifices 252a-c can be calibrated to a lower level of precision during manufacture of the flow blender device 300, in particular if the outlet variable sized orifice 258 is calibrated to a high level of precision. The time and cost saving of calibrating a variable sized orifice to a lower level of precision can be significant, especially when dealing with multiple variable sized orifices in a single flow blender device. Another advantage of the outlet variable sized orifice 258 is its function as a diagnostic device to confirm proper functionality of the variable sized orifices 252a-c. Likewise, the variable sized orifices 252a-c can be used to confirm functionality of the output variable sized orifice 258.

In one example, the total flow rate $Q_T$ of flow rates $Q_1$, $Q_2$, $Q_3$ from the variable sized orifices 252a-c must be within about ±0.1% to about ±5% of the flow rate $Q_4$ from the output variable sized orifice 258. Preferably, the total flow rate $Q_T$ must be within about ±0.5% to about +2% of the output flow rate $Q_4$. If the flow rates $Q_T$, $Q_4$ are not within a prescribed percentage range of each other, the control system for the fluid blender device 300 can be provided with a feedback loop that results in, for example, modifications to the set point inputs or output ratio input, generation of a notice to the operator, or shut down of the flow blender device 300.

C. Example of FIG. 4

Figure 4:
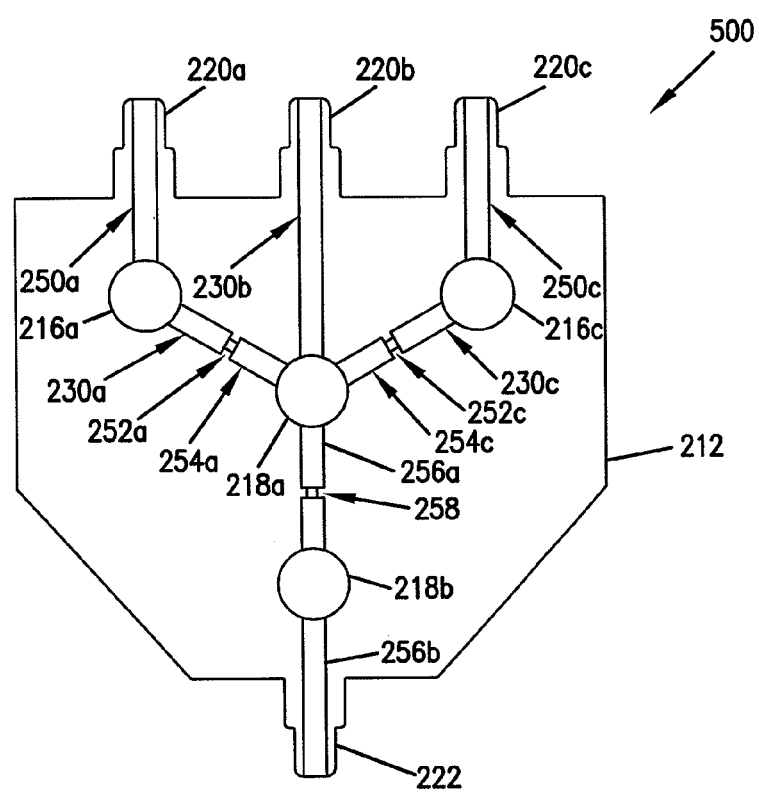
FIG. 4 is a schematic top view of another example flow blender in accordance with the present disclosure having multiple variable sized orifices and a pass-through conduit.

FIG. 4 illustrates another example flow blender device 500 that includes many of the features of flow blender devices 200, 400 described above. Flow blender device 500 includes two inlet conduits 230a, c and a pass-through inlet conduit 230b. The inlet conduits 230a, c each include upstream pressure sensors 216a, c and a variable sized orifice 252a, c. The downstream segments 254a, c of the inlet conduits 230a, c are in fluid communication with outlet conduit segments 256a, b and an outlet variable sized orifice 258. Pressure differential measurements are taken across the orifices 252a, c using the pressure sensors 216a, c and pressure sensor 218a. A pressure differential measurement is taken across the outlet variable sized orifice 258 using the pressure sensors 218a, b.

The pass-through inlet conduit 230b feeds directly from the inlet conduit connector 220b to the outlet conduit segment 256a. Pass-through conduit 230b does not include a variable sized orifice or an upstream pressure sensor. It is possible to position On/Off valves upstream of the flow blender device 500 to control fluid flow to each of the conduits 250a-c. The upstream valves (not shown) can be used to select the flow of fluids to the inlet conduits 230a, c for the purpose of blending those fluids, or be used to provide a single fluid to the pass-through conduit 230b.

Typically, the flow blender device 500 is used in one of two different modes. In a first mode, two different fluids are passed through the inlet conduits 230a, 230b, respectively, and into the outlet conduit 256a, b. The device 500 determines a flow rate through each of the conduits 230a, b, and the combined flow rate through conduits 230a, b is confirmed by calculating the flow in outlet conduit 256a, b using the outlet variable sized orifice 258 and a pressure differential measurement taken using the pressure sensors 218a, b. In a second mode, a fluid is fed through the pass-through conduit 230b and out of the device 500 through the outlet conduit 256a, b. In the second mode, the total flow rate can be determined using the outlet variable sized orifice 258 and a pressure differential measurement determined using pressure sensors 218a, b. The output flow in conduits 256a, b can also be controlled by the orifice 258 in the second mode. Alternatively, the fluid in pass-through conduit 230b is not metered or controlled, but merely passes through a device 500.

The flow blender device 500 can have several advantages related to its multifunction capabilities. For example, the flow blender device 500 can be used to blend two different fluid flows. The blended fluid flow can be accurately metered and controlled based on any flow rate set point inputs and blend ratio input. The flow blender device 500 can also be used to meter and control a single fluid flow. The flow blender device 500 can also function as a pass-through device without metering or controlling any of the fluid flow through the device 500. In one application, the flow blender device 500 in a first mode functions to blend two different process fluids passing through respective flow conduits 230a, c into a single blended fluid. In a second mode of the example application, the pass-through conduit 230b passes a cleaning fluid through the flow blending device 500 and a downstream location where the cleaning fluid flushes out the blended process fluid.

D. Example of FIG. 5

Figure 5:
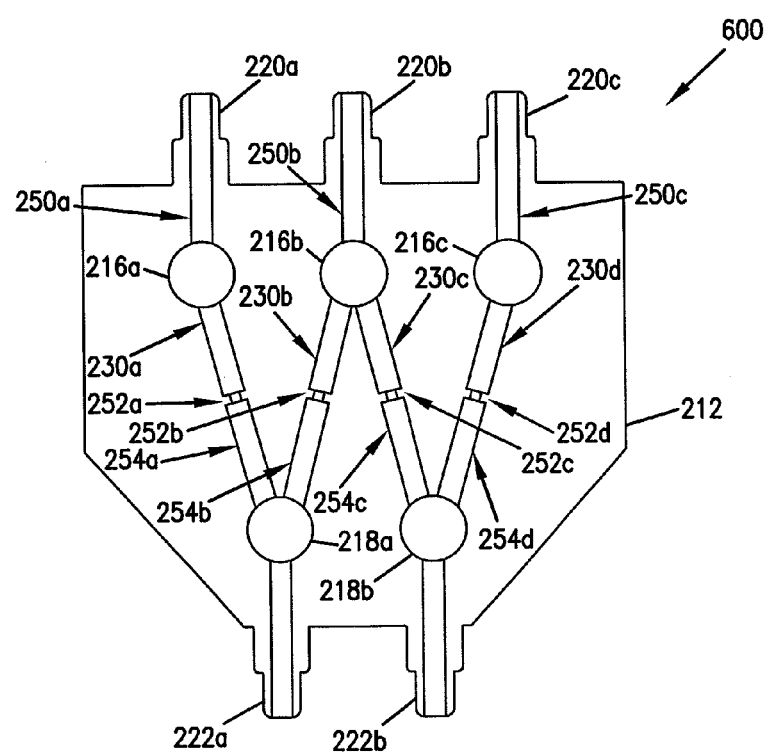
FIG. 5 is a schematic top view of another example flow blender in accordance with the present disclosure having multiple inputs and multiple outputs.

FIG. 5 illustrates another example flow blender device 600 that includes many of the features of flow blender devices 200, 400, 500 described above. Flow blender device 600 includes a housing 212, upstream pressure sensors 216a-c, downstream pressure sensors 218a, b, three inlet conduit connectors 220a-c, and two outlet conduit connectors 222a, b. Inlet conduits 230a, d extend from the pressure sensors 216a, c to pressure sensors 218a, b. Inlet conduits 230b, c extend from the pressure sensor 216b to pressure sensors 218a, b. The inlet conduits 230a-d each include one of the variable sized orifices 252a-d and a downstream segment 254a-d. Pressure differential measurements are taken across the orifices 252a-d using the pressure sensors 216a-c and 218a, b.

The flow blender 600 shown in FIG. 5 provides the option of obtaining two blended fluids from a single flow blender device. It is a common practice in many industrial processes to purchase concentrated chemicals in bulk, and then dilute them with a fluid such as deionized water to obtain the necessary concentration of chemical required for a process. The flow blender 600 can be particularly useful when a common liquid such as deionized water entering the blender 600 through inlet conduit connector 220b is blended with two other liquids entering blender 600 through inlet conduit connectors 220a, c to form two different blended fluid outputs at outlet conduit connectors 222a, b. The device shown in FIG. 5 can also produce two different concentrations of the same chemical by passing the same liquid through inlet conduits 230a, c, varying the flow of those fluids at the variable sized orifices 252a, d, and blending with a different fluid that passes through inlet conduits 230b, c.

The flow blender device 600 can have several advantages related to its multifunction capabilities. For example, the flow blender device 600 can be used to accurately meter and control flow of two different fluid outputs based on any flow rate set point inputs and blend ratio input for the three fluid inputs to the device 600. The flow blender device 600 can also be used to meter and control a single fluid flow. The flow blender device 600 can also function as a pass-through device without metering or controlling any of the fluid flow through the device 600.

E. Example Control Arrangement

Figure 6:
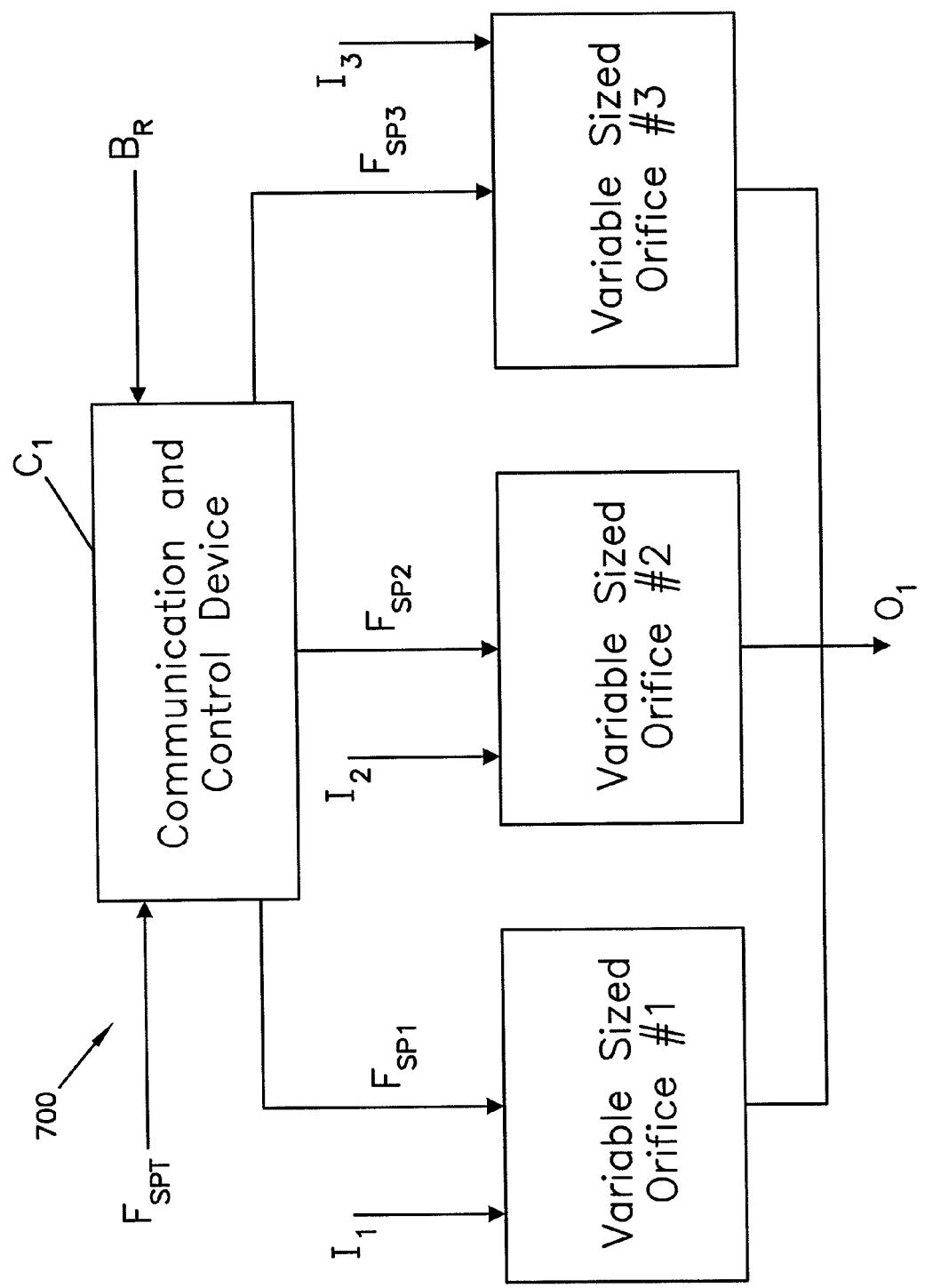
FIG. 6 is a schematic diagram illustrating a control system for a flow blender in accordance with the present disclosure.

Referring now to FIG. 6, an example control system 700 for use with the flow blender device 200 described above, wherein a single controller is used to control all of the variable sized orifices of a single flow blending device. The system 700 includes fluid inlets $I_{1-3}$, a blended fluid outlet $O_1$, variable sized orifices #1-3 that operate between the inlets $I_{1-3}$ and $O_1$, and a communication and control device $C_1$. A total flow rate set point $F_{SPT}$ input and a blend ratio $B_R$ input can be sent from a host, such as a personal computer or process control system, to the device $C_1$. This input information to the device $C_1$ can be in the form of an analog signal or a digital communication signal, or by manual input means. The input information $F_{SPT}$ and $B_R$ is required for operating the flow blender. The device $C_1$ determines the flow set point $F_{SP1-3}$ for each of the variable sized orifices #1-3.

Figure 16:
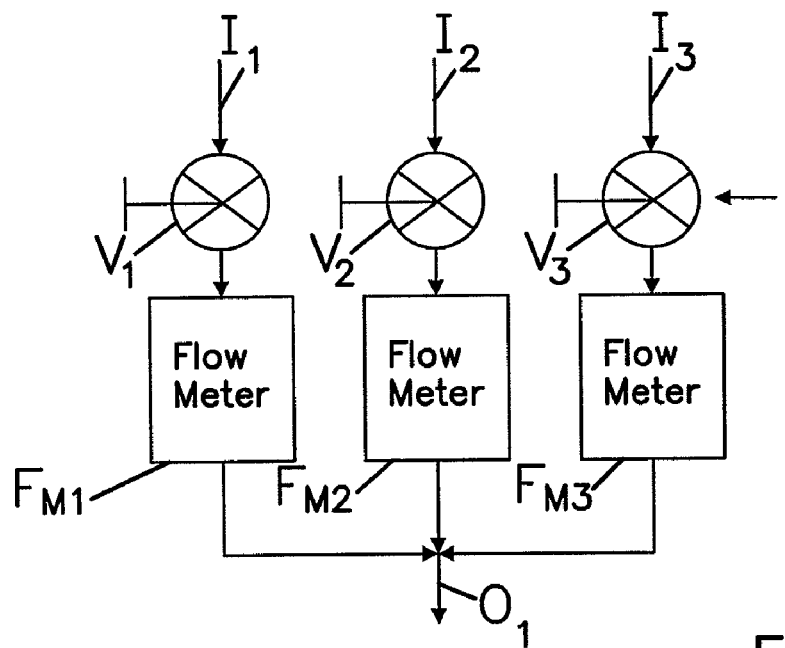
FIG. 16 is a schematic diagram illustrating a prior art fluid flow blender.
Figure 17:
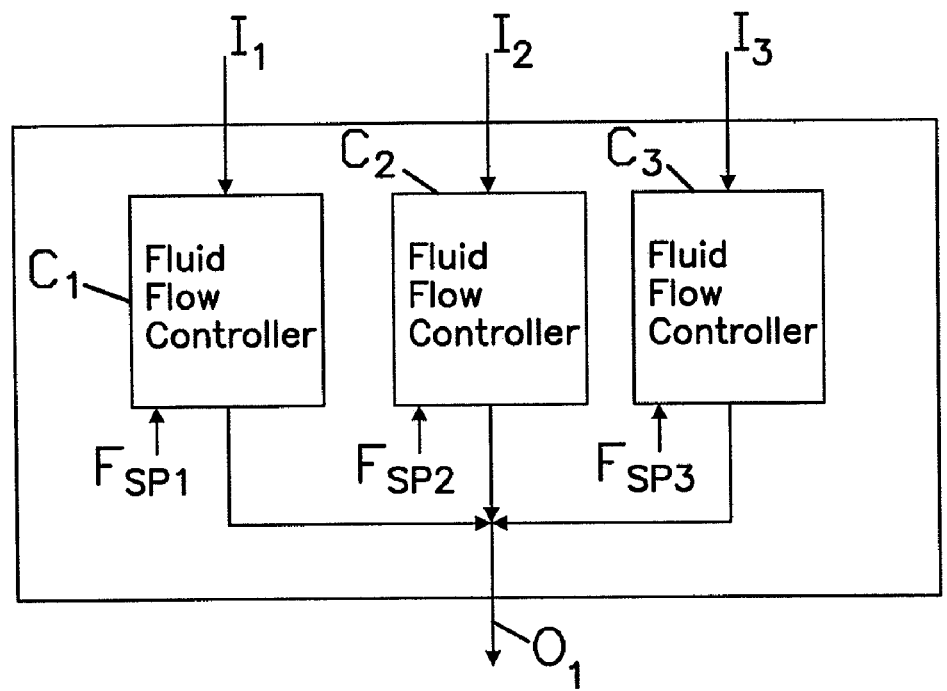
FIG. 17 is schematic diagram illustrating aspects of another example fluid flow blender.

The system 700 shown in FIG. 6 can have advantages over other systems such as, for example, the system shown in FIG. 16. One such advantage is that the controls or intelligence for the entire blending assembly resides in one field mounted device. That is, to the user or the host, the blending assembly looks like one device rather than three separate devices. The user needs only to provide the blending setup information (e.g., total flow rate set point and blend ratio) to one controller, and not to three separate controllers.

In one example application, if the blend ratio for the output $O_1$ must remain the same, but the total flow rate at output $O_1$ must increase, the user need only send the new total flow rate set point input to the device $C_1$. The device $C_1$ then determines the new set points for all three variable sized orifices. Therefore, if a host computer or control system is operating the blending assembly, some of the work of that host is offloaded to the device $C_1$, which frees up the host to perform other higher level tasks.

III. Example Variable Sized Orifice Flow Device

An example flow device 10 illustrating an example variable sized orifice for controlling and metering fluid flow is shown in FIGS. 7-14. Various aspects of the variable sized orifice described with reference to device 10 and FIGS. 7-14 can be implemented as the variable sized orifice features of the flow blender devices described above with reference to FIGS. 1-6. Further, various aspects of the pressure sensors, conduits, controls, and other features described with reference to device 10 and FIGS. 7-14 can also be used in the example flow blenders described above with reference to FIG. 1-6.

Figure 7:
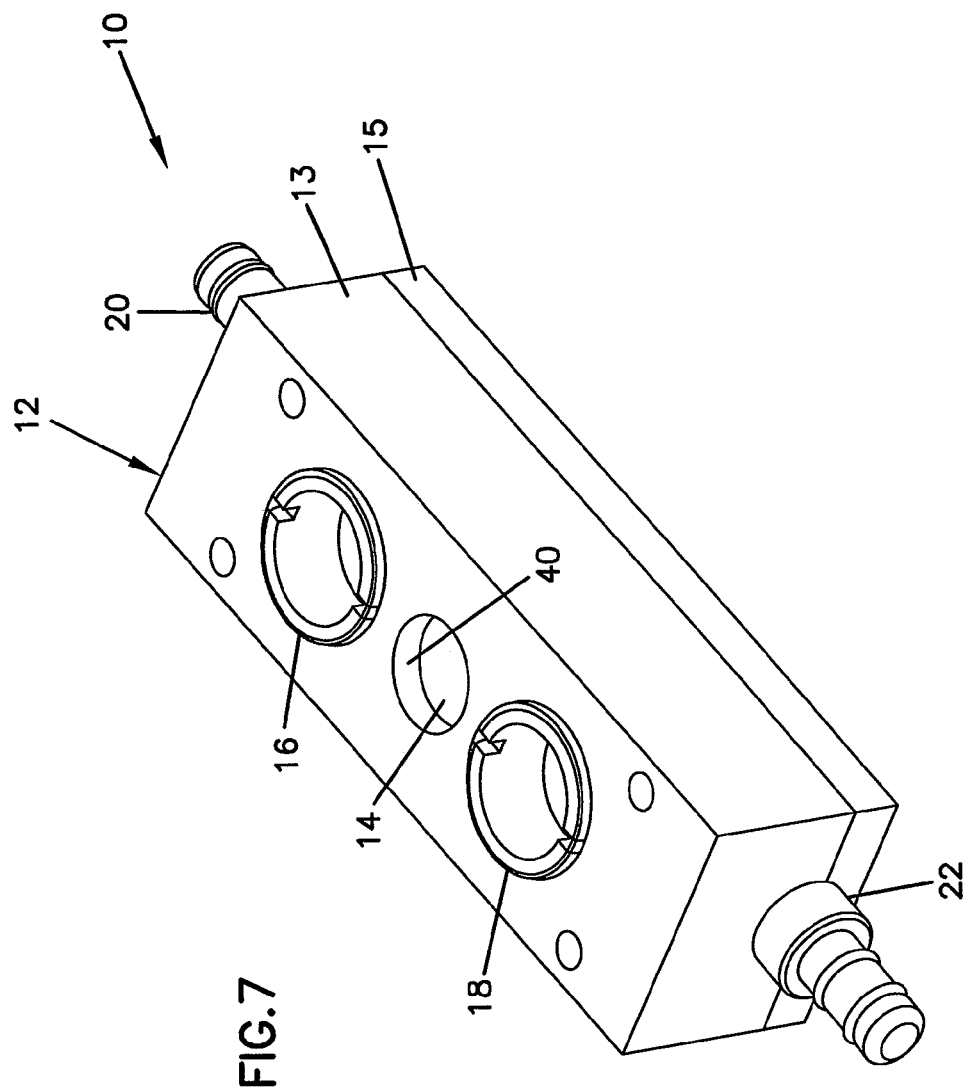
FIG. 7 is a top perspective view of a flow device having a variable sized orifice in according with principles of the present disclosure.
Figure 8:
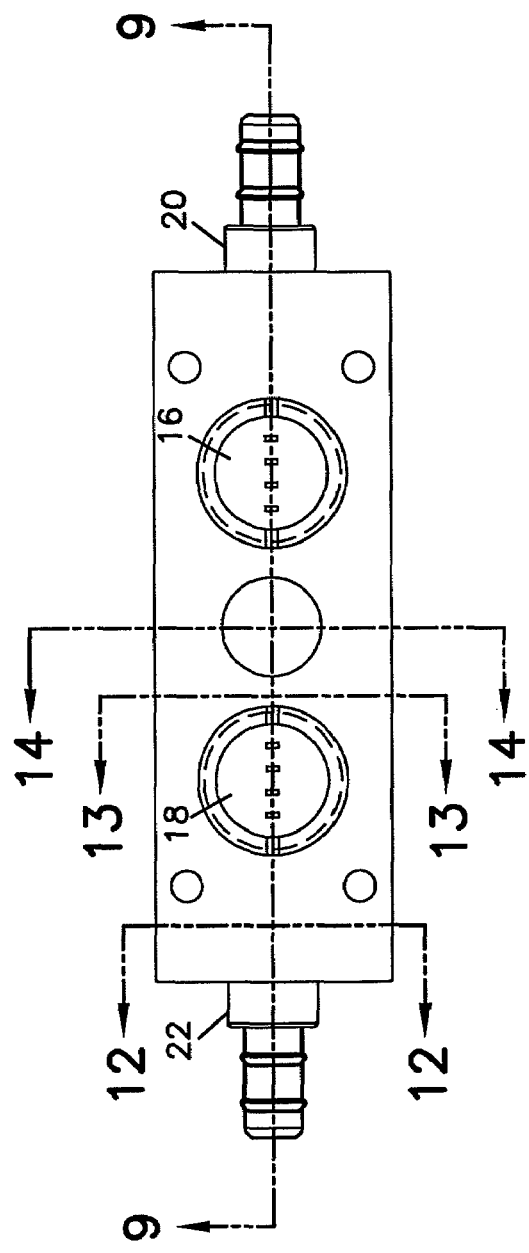
FIG. 8 is a top plan view of the flow device shown in FIG. 7.
Figure 9:
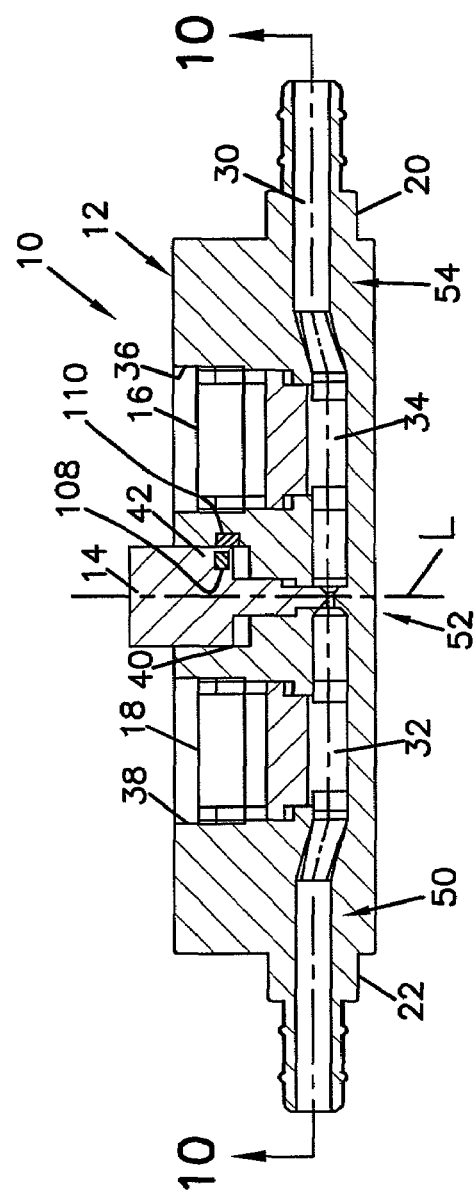
FIG. 9 is a cross-sectional view of one example configuration of the flow device shown in FIG. 8 taken along cross-section indicators 9-9.
Figure 10:
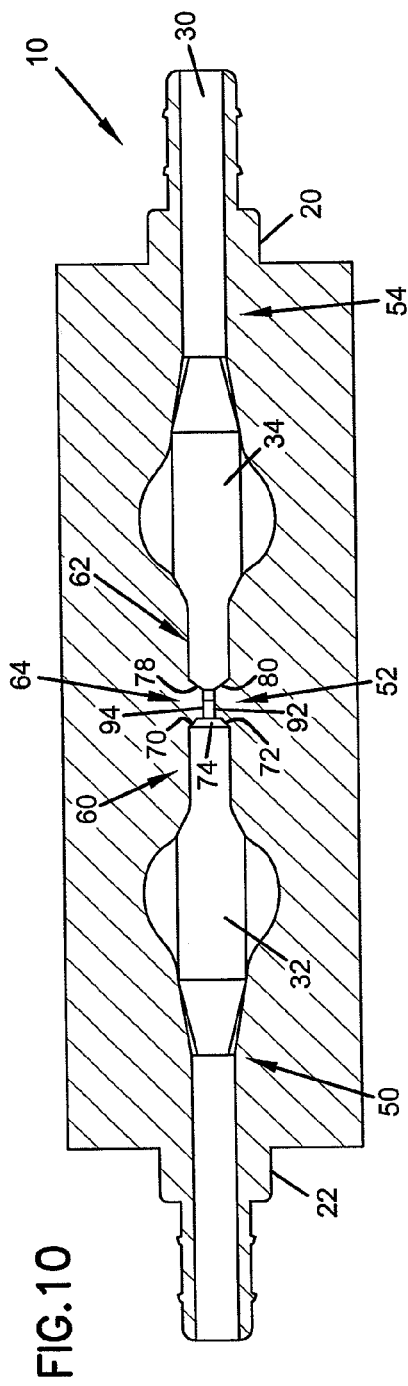
FIG. 10 is a cross-sectional view of the example flow device shown in FIG. 8 taken along cross-section indicators 10-10.

The device 10 includes a housing 12, a movable element 14, first and second pressure sensors 16, 18, and inlet and outlet conduit connectors 22, 20. A conduit 30 is formed through the housing and includes first, second and third segments 50, 52, 54 (see FIGS. 9 and 10). The housing also includes first and second sensor bores 36, 38 that intersect with the conduit 30 in a direction transverse to the conduit 30, and an element bore 40 that also intersects with conduit 30 in a direction transverse to conduit 30 (see FIG. 9). In this example, element bore 40 and sensor bores 36, 38 extend parallel to each other, but can be aligned perpendicular to each other in other embodiments. Housing 12 can be divided into separate pieces or halves 13, 15 (see FIG. 7) to facilitate precise formation of features within the housing. FIG. 7 illustrates the housing 12 divided along a generally horizontal plane through the conduit 30. Alternatively, the housing 12 can be divided along a generally vertically aligned plane through the conduit 30, or divided in any other manner. The housing 12 can also be integrally formed as a single piece with features such as the conduit 30 drilled or otherwise formed in the housing 12.

Movable element 14 includes a base 42 and a contact member 44. The movable element 14 is positioned in element bore 40 and arranged to extend into second segment 52 of the conduit 30. Contact member 44 includes a leading edge 46, a tapered trailing edge 48, and a planar contact surface 49 (see FIG. 11) configured to mate with a planar surface (for example, fixed wall 90 described below and shown in FIG. 11) of second segment 52. The movable element 14 is moveably adjustable along a linear axis L (see FIG. 9) through a range of positions between an open (retracted) position and a closed position, with movement of the movable element 14 being limited to the linear axis. The open position allows a maximum fluid flow through the conduit 30. The fluid flow through the conduit 30 decreases as the movable element 14 is moved toward the closed position due to contact with the fluid. Adjustment of the movable element 14 in element bore 40 can be performed using, for example, a linear actuator, a stepper motor, a hydraulic or pneumatic actuator, a solenoid, a servo motor, or a manual device such as a threaded shaft with a thumb turn button. The position of the movable element 14 can be determined using, for example, a sensor 110 (see FIG. 9). The sensor 110 can be, for example, a Hall effect sensor, a magnetostrictive device, a linear variable differential transformer (LVDT), an optical encoder, or other position determining device. Some sensors require a reference member 108 (see FIG. 9) on movable element 14 of the device to help determine relative movement of the movable element 14.

Limiting movement of element 14 to linear motion within element bore 40 can simplify methods of determining an accurate position of movable element 14. One example method infers a position of the movable element 14 based on incremental movement of the movable element 14. A stepper motor is one example of a device that could be used to provide incremental movement of the movable element 14 in the form of steps. In one example, the movable element 14 can be movable a certain number of steps from a reference position (e.g., a fully open or fully closed position). Software used to control the device 10 can be programmed to convert the number of steps traveled into a distance value. An independent position measuring device would not be needed in such a configuration, resulting in reduced complexity in the hardware used for device 10. A possible drawback of this method is the potential for inaccurate position measurements if the element becomes locked in a single position and the processor thinks that the element is moving a certain number of steps when the element is actually stationary. An encoder used with a stepper motor, a linear actuator, or other device that "infers" a linear position from related incremental movement can have similar potential accuracy issues.

Second segment 52 includes an inlet portion 60, an outlet portion 62, and an orifice portion 64 positioned between the inlet and outlet portions 60, 62. The inlet portion 60 is in fluid communication with sensor chamber 32 at one end, and includes a plurality of tapered surfaces at a second end adjacent to the orifice portion 64. Similarly, outlet portion 62 is in fluid communication with sensor chamber 34 at one end, and includes a plurality of tapered surfaces at an opposing end adjacent to orifice portion 64.

The inlet and outlet portions of the orifice segment of the device include a plurality of fixed sidewalls that define a noncircular cross-section. Other arrangements can include inlet and outlet portions of the orifice segment that have a circular cross-section, which configuration may be preferred in some instances. The example first and third portions 60, 62 include four fixed walls substantially in the shape of a rectangle (see example cross-section of inlet portion 60 in FIG. 13). As used throughout this document, rectangular is defined as a four-walled shape and a square is defined as a rectangle that has four walls of the same length. The walls of a rectangle are substantially flat with linear edges at the intersection of two walls. The intersection of two walls also defines a 90° angle. In some applications, the corners of the rectangle can be tapered slightly with a round, fillet, chamfer or like feature as a result of manufacturing limitations. Further, a portion of one or more of the walls can be slanted or chamfered slightly to create sealing points or to meet other design goals and/or address manufacturing limitations. In embodiments that include a combination of linear and curved walls (not shown), the intersection of these walls can also include features such as rounds, fillets, chamfers, etc. Finally, a portion of one or more of the walls can be defined by an exposed face of a gasket or seal.

Tapers 70, 72, 74, 76 are formed in the sidewalls of inlet portion 60 to reduce the cross-sectional area at a point in channel 30 where inlet portion 60 abuts to orifice portion 64. The tapers 70, 72, 74, 76 are aligned at a single axial position to create a reduction in cross-sectional area of portion 60 in a single step (see FIG. 9-11). Outlet portion 62 also includes a square shaped cross-section with tapered surfaces 78, 80 (see FIG. 10) on opposing sidewalls to reduce the cross-sectional area of outlet portion 62 at the transition point between orifice portion 64 and outlet portion 62.

Figure 11:
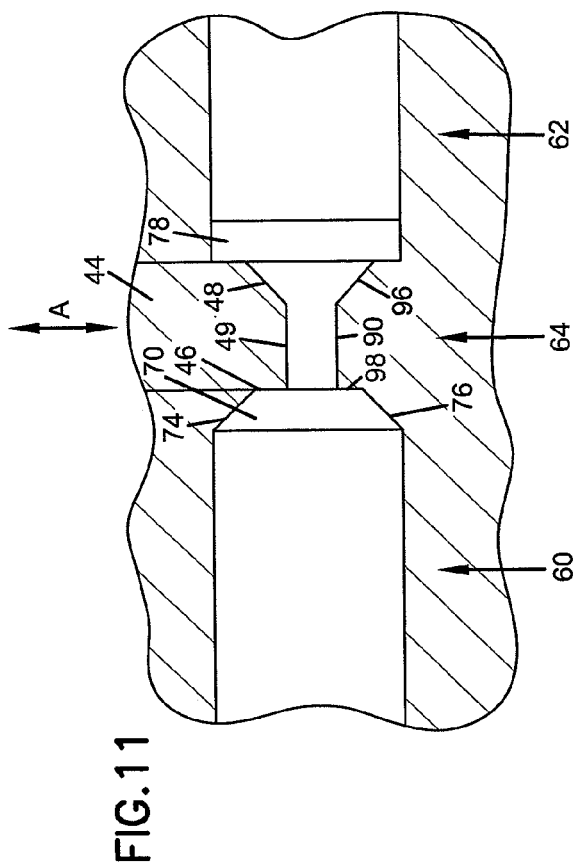
FIG. 11 is an enlarged view of the orifice and movable element portion of the device shown in FIG. 9
Figure 14:
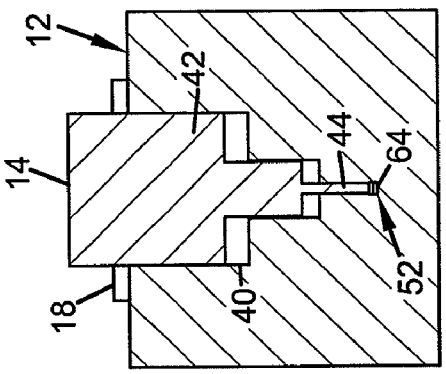
FIG. 14 is a cross-sectional view of the example flow device shown in FIG. 8 taken along cross-section indicators 14-14.
Figure 13:
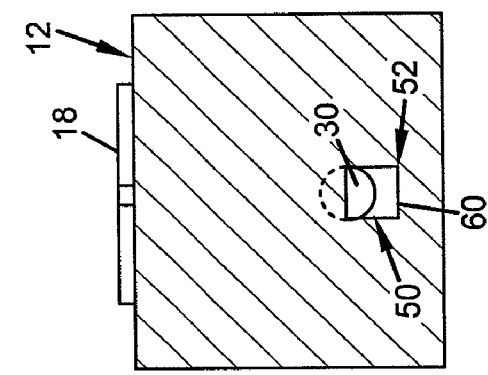
FIG. 13 is a cross-sectional view of the example flow device shown in FIG. 8 taken along cross-section indicators 13-13, the example device having a rectangular inlet to the orifice.
Figure 12:
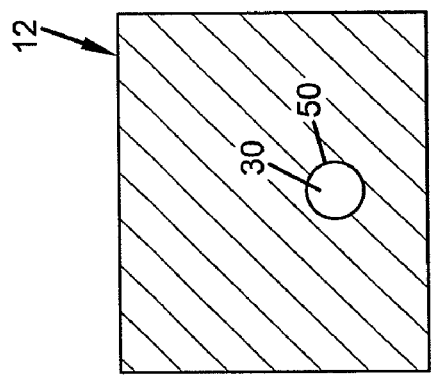
FIG. 12 is a cross-sectional view of the example flow device shown in FIG. 8 taken along cross-section indicators 12-12.

Orifice portion 64 includes three fixed walls 90, 92, 94 with fixed wall 90 including a tapered trailing edge 96 and a leading edge 98 (see FIG. 11). The cross-sectional area of orifice portion 64 tapers out to a larger cross-sectional area of portion 62 in two steps with sets of tapers 96, 48 and 78, 80. As shown in the cross-sectional view of FIG. 13, orifice portion 64 has a relatively small cross-sectional area as compared to the cross-sectional area of inlet portion 60 shown in FIG. 12.

The leading edges 46, 98 and trailing edges 96, 48 of respective moving element 44 and orifice portion 64 provide consistent flow characteristics into and out of the orifice portion 64. A cross-sectional size of the orifice portion 64 is determined by the location of the movable element 14 in relation to the fixed walls 90, 92, 94 of the orifice portion 64. The orifice portion 64 is void of sensor openings and dead volume spaces to avoid disruptions to the fluid flow and potential accumulation of process material or sediment.

A linear actuator (not shown) such as those discussed above (e.g., stepper motor, servo motor, etc.) can be used to affect movement of the movable element 14. By moving along a single linear axis, the movable element 14 linearly changes the cross-sectional size of the orifice portion 64 while maintaining a generally uniform shape to provide a relatively consistent set of flow characteristics through the range of movable element positions. The cross-sectional shape of orifice portion 64 allows repeatable regulation of the fluid flow in accordance with the position of movable element 14 within the range of linear positions of the movable element 14. In one example wherein the uniform shape is a rectangle, the height of the cross-sectional area of the orifice portion 64 is reduced in size as the movable element 14 moves between the open and closed positions. Maintaining a rectangular shape, or at least a shape having at least one planar sidewall or linear edge, minimizes variations in flow characteristics (variable "K" in the flow rate equation in the Background section), thus reducing errors when determining the flow rate for each orifice size.

In use, fluid first enters flow device 10 (which example will be used for the remainder of the description of various aspects of the invention) through first segment 50 of conduit 30. The flow through segment 50 has flow characteristics that match the circular cross-section of first segment 50. The flow then enters the open sensor chamber 32 where a transition volume is provided prior to the fluid flow entering the non-circular inlet portion 60 of second segment 52. The flow is then reduced in cross-sectional area by the several tapers formed in inlet portion 60 just before orifice portion 64. As mentioned above, a higher pressure is generated at the inlet to orifice portion 64 due to the very small cross-sectional area of orifice portion 64 relative to the cross-sectional size of conduit 30 in segment 50. The cross-sectional area of orifice portion 64 is dependent on the position of movable element 14 in the direction A. Each position along the direction A corresponds to a different cross-sectional area of the orifice portion 64 for use in determining the volumetric flow through the flow device 10.

As the fluid exits orifice portion 64, the cross-sectional area of the conduit 30 increases due to outward tapers 78 and 80 and trailing edges 48 and 96 of the movable element 14 and orifice portion 64 as the flow enters portion 62. The cross-sectional area of outlet portion 62 preferably has the same size and shape as the cross-section of inlet portion 60 (which is a square cross-section in the example flow device in flow device 10—see FIGS. 8 and 12-14). Flow exiting outlet portion 62 enters sensor chamber 34 where another transition volume is provided before the fluid flow enters the third segment 54 and takes on a flow pattern for the circular cross-section of third segment 54.

The first and second pressure sensors 16, 18 are positioned at opposing sides of orifice portion 64 so as to be able to determine a difference in pressure at the inlet and outlet sides of second segment 52 of conduit 30. The first and second pressure sensors 16, 18 can be mounted proximate the process liquid to minimize the amount of dead volume of the fluid and reduce crystallization and particle buildup between the first and second pressure sensors 16, 18 and the fluid in conduit 30. In alternative arrangements, a single differential pressure sensor can be used to communicate with both the first and second sensor chambers 32, 34 to determine the pressure difference across orifice portion 64. Furthermore, only a single pressure sensor may be required in applications where one of the first and second sensor chamber 32, 34 has a fixed pressure condition. For example, if the second sensor chamber 34 is downstream of the orifice and empties into an open tank at atmospheric pressure, a downstream pressure measurement is not required. In this arrangement, the pressure measurement from the first sensor 16 can be used with atmospheric pressure conditions (the pressure condition downstream of the orifice section 64) to determine the pressure differential. Likewise, if the first sensor chamber 32 is upstream of the orifice portion 64 and is accepting liquid from a pressurized tank where pressure is accurately controlled to a fixed pressure value, a separate upstream pressure measurement is not required and the pressure measurement from the second sensor 18 can be used with the fixed upstream pressure value to determine the pressure differential.

Other example embodiments can use a single differential pressure sensor that takes pressure readings from the inlet and outlet sides of the orifice portion of the device and determines a differential pressure across the orifice portion. This and other types of sensors do not necessarily have to be mounted in a sensor bore, nor does the sensor bore being used require a larger cross-sectional area than the cross-sectional area of the conduit. For example, a sensor can be configured to obtain pressure readings using a small probe that requires a very small entrance opening into the conduit relative to the conduit size, and the sensor can be mounted at a different location within or adjacent to the device housing.

Yet further embodiments may not include any sensors associated directly with the device, but can be configured to use pressure signals provided by outside sources. Such pressure readings from an outside source can include, for example, a pressure reading from a pressure sensor positioned up or down stream from the device, or a pressure signal representative of a known static pressure condition for the system either up or down stream of the device. Thus, although the device does not require a pressure sensor, the device is preferable configured to use a pressure signal for purposes of metering and controlling fluid flowing through the device.

A pressure signal representing a pressure differential across an orifice can be used with the cross-sectional area of the orifice, the cross-sectional area of the inlet and outlet portions just before and after the orifice, and the density of the fluid to determine the volumetric flow rate.

An advantage of the features of device 10 is that the pressure signal ($\Delta P$) can be optimized at each flow rate by varying the orifice size. For example, the pressure signal can be set at a minimum value for a given flow rate by varying the orifice size. The pressure signal can also be optimized for a desired flow rate or inlet pressure by varying the orifice size.

Furthermore, although the cross-sections of the inlet, outlet and orifice portions 60, 62, 64 of second segment 52 are shown having a square shape, it can be appreciated that the cross-section of portions 60, 62, 64 can be different shapes, such as, but not limited to, rectangles, isosceles triangles or the like. Furthermore, portions 60, 62, 64 of the second segment 52 can have dissimilar cross-sectional shapes and sizes, and can have varying shapes or sizes along a length of each portion 60, 62, 64. Additionally, although the orifice portion 64 has a rectangular cross-section, the leading and trailing portions of the orifice portion 64 defined by the leading and trailing edges 46, 48 of the contact member 44 of the movable element 14, and the leading and trailing edges 98, 96 of the fixed walls 90, 92, 94 can have different sizes, shapes and orientations than those shown in the Figures.

Other example variable sized orifice flow devices and further aspects of the flow device 10 are shown and described in U.S. Published Patent Application No. 2005/0051215 and U.S. Pat. Nos. 7,082,842 and 7,096,744, which patent matters are incorporated herein by reference.

Figure 15:
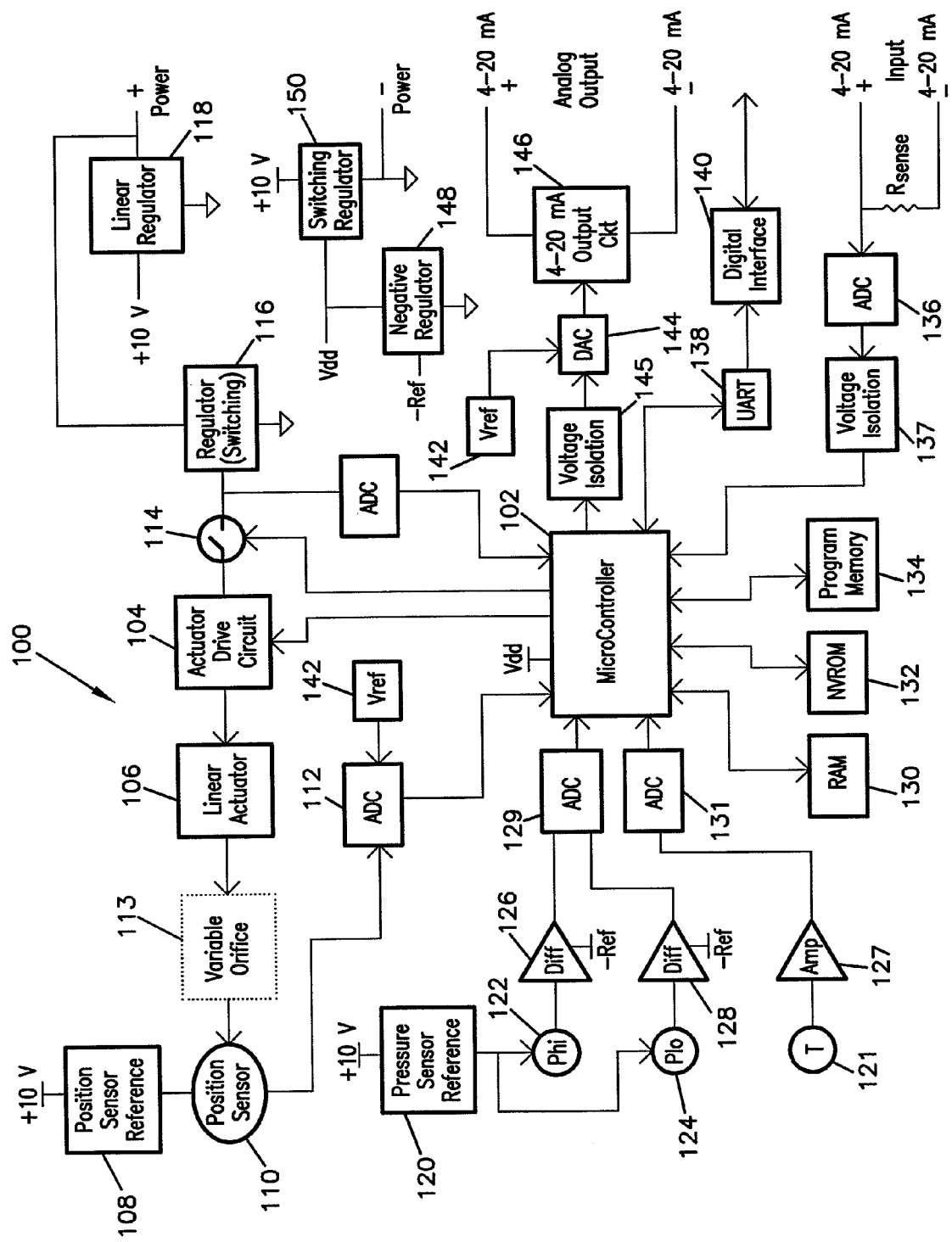
FIG. 15 is a schematic circuit diagram for the flow device shown in FIG. 7.

Features of flow device 10 shown in FIGS. 7-14 are shown schematically as part of a flow device assembly 100 in FIG. 15. Assembly 100 includes a microcontroller 102 that controls and communicates with most of the other assembly features. Assembly 100 includes an actuator drive circuit 104, a linear actuator 106, a position sensor reference 108, a position sensor 110, and an analog-to-digital converter (ADC) 112 that relate to the flow device variable sized orifice 113, and a switch 114, regulator 116, regulator 150, and linear regulator 118 that control power to the features 106, 108, 110, 112. Microprocessor 102 can be any suitable processor or controller such as, for example, the HD64F3062 32-bit microprocessor manufactured by RENESAS of San Jose, Calif.

The assembly 100 also includes a pressure sensor reference 120, a high pressure sensor 122, a low pressure sensor 124, and difference amplifiers 126, 128 and an ADC 129 that together are used to determine a pressure differential in the flow device 100. The assembly 100 also includes a temperature sensor 121, a temperature amplifier 127, and a related analog-to-digital converter (ADC) 131 that are used to determine a temperature of the fluid in the flow device. Different memory devices such as RAM 130, NVROM 132, and program memory 134 can be used by the microprocessor 102 to store data, such as instructions, code, algorithms, etc.

The microprocessor 102 can receive inputs in the form of current signals having a magnitude of, for example, about 4 mA to about 20 mA that are converted to digital signals using ADC 136 and voltage isolation 137. Microprocessor 102 can communicate with direct digital signals through a UART (Universal Asynchronous Receiver/Transmitter) 138 and a digital interface 140. Microprocessor 102 can also generate output signals that are converted to analog signals with the voltage reference 142, digital-to-analog converter (DAC) 144, voltage isolation 145, and an output circuit 146 that generates signals having a magnitude of, for example, about 4 mA to about 20 mA. Assembly 100 can use a power source that includes a negative regulator 148 and the switching regulator 150 for powering various features of the assembly 100.

The positioning sensor 110 in one example is a Hall effect sensor. The Hall effect sensor measures a linear position of a magnet (e.g., position sensor reference 108) contained in the movable element of the flow device that varies the orifice opening of the flow device (see FIG. 9). Since the orifice opening in the flow device 10 shown in FIGS. 7-14 has at least one planar wall, the orifice cross-sectional area is linearly proportional to the position of this sliding element. By monitoring the Hall effect sensor output, the microprocessor 102 in flow meter assembly can determine the orifice opening area. The microprocessor 102 can use the position and pressure measurements along with information about the fluid in the device 10 to determine the fluid flow rate through the device 10.

III. Summary and Conclusion

One aspect of the present disclosure relates to a method of metering fluid flow through a flow blending device. The flow blending device includes at least two input flow paths each carrying a fluid, a single output flow path, and a pressure sensing arrangement. Each of the input flow paths includes a variable orifice. The method includes determining an orifice geometry defined by each variable orifice, measuring a pressure differential across each variable orifice with the pressure sensing arrangement, determining a fluid flow through each variable orifice using the measured pressure differentials and the determined orifice geometries, and determining a first fluid flow through the output flow path using the determined fluid flow through each variable orifice.

Another aspect of the present disclosure relates to a method of controlling fluid flow through a device that includes a pressure sensor, a plurality of fluid inlet conduits each having a first portion with a circular inner cross-section, a second portion with a rectangular inner cross-section and at least one planar wall, and a movable element having at least one linear edge. The method includes moving the movable element in each fluid inlet conduit in a direction transverse to a direction along a length of the conduit, and engaging the linear edge of the movable elements with the at least one planar wall of the conduits when in the closed position to form a seal with the at least one planar wall.

A further aspect of the present disclosure relates to a device for controlling fluid flow, of the type having a variable orifice and configured to use a pressure signal. The device includes at least two inlet fluid conduits each having a circular cross section portion, a single outlet fluid conduit in fluid communication with each of the inlet fluid conduits, and a separate orifice positioned along a length of each inlet fluid conduit. Each orifice has at least one planar wall extending in a longitudinal direction of the inlet fluid conduit. The device further includes an element associated with each orifice. The elements each have a linear edge configured to mate with the at least one planar wall of the orifice to form a seal therewith. The element is movable in a direction transverse to the longitudinal direction between an open position wherein fluid flows through the orifice and a closed position wherein the element substantially shuts off fluid flow through the orifice.

A still further aspect of the present disclosure relates to a device for metering fluid flow that includes a housing, a plurality of fluid inlet conduits positioned in the housing, an outlet fluid conduit, and a plurality of pressure sensors. At least one of the fluid inlet conduits includes a variable sized orifice. Each variable sized orifice includes an element movable in the fluid inlet conduit to vary a size of the variable sized orifice. The fluid outlet conduit is coupled in fluid communication with the fluid inlet conduits. The plurality of pressure sensors are configured to determine a pressure differential across each variable sized orifice.

Another aspect of the present disclosure relates to a flow device that includes at least first and second input flow paths in fluid communication with a single output flow path, a first and second variable sized orifices, and a controller. The first variable sized orifice is positioned in the first input flow path and the second variable sized orifice is positioned in the second input flow path. Each variable sized orifice includes an orifice opening and an element movable in a direction transverse to fluid flowing through the orifice opening to change a size of the variable sized orifice. The controller receives inputs of a target total flow rate at the output flow path and a blend ratio of the volume of fluids from the first and second input flow paths present in the output flow path. The controller controls a position of the movable elements of the first and second variable sized orifices in response to the target flow rate and blend ratio inputs.

The above specification provides examples of how certain inventive aspects may be put into practice. It will be appreciated that the inventive aspects can be practiced in other ways than those specifically shown without departing from the spirit and scope of the inventive aspects.

We claim:

1. A method of metering fluid flow through a flow blending device, the flow blending device including at least two input flow paths each carrying a fluid, a single output flow path in fluid communication with the at least two input flow paths, and a pressure sensing arrangement, each of the input flow paths including a variable orifice, the method comprising the steps of:

determining an orifice geometry defined by each variable orifice;

measuring a pressure differential across each variable orifice with the pressure sensing arrangement;

determining a fluid flow through each variable orifice using the measured pressure differentials and the determined orifice geometries; and determining a first fluid flow through the output flow path using the determined fluid flow through each variable orifice;

wherein the flow blending device further includes a pressure sensor associated with each flow path and adapted to provide pressure signals for measuring the pressure differential across each variable orifice.

2. The method of claim 1, wherein the flow blending device further includes a temperature sensor associated with each flow path, the method further comprising determining a temperature of the fluid in each flow path with the thermometers, the determined temperature used in determining fluid flow in through each variable orifice.

3. The method of claim 1, wherein the flow blending device comprises an output variable orifice in the output flow path, the method further comprising determining a pressure differential across the output variable orifice with the pressure sensing arrangement, determining an orifice geometry defined by the output variable orifice, and determining a second fluid flow through the output flow path using the determined geometry and pressure differential for the output variable orifice.

4. The method of claim 3, further comprising comparing the first and second fluid flows in the output fluid path.

5. A method of controlling fluid flow through a device that includes a pressure sensor, a plurality of fluid inlet conduits each having a first portion with a circular inner cross-section, a second portion with a rectangular inner cross-section and at least one planar wall, and a movable element having at least one linear edge, the method comprising the steps of:

moving the movable element in each fluid inlet conduit in a direction transverse to a direction along a length of the conduit; and engaging the linear edge of the movable elements with the at least one planar wall of the conduits when in the closed position to form a seal with the at least one planar wall.

6. A device for controlling fluid flow, of the type having a variable orifice and configured to use a pressure signal, comprising:

at least two inlet fluid conduits each having a circular cross section portion;

a single outlet fluid conduit in fluid communication with each of the inlet fluid conduits a separate orifice positioned along a length of each inlet fluid conduit, each orifice having at least one planar wall extending in a longitudinal direction of the inlet fluid conduit; and an element associated with each orifice, the element having a linear edge configured to mate with the at least one planar wall of the orifice to form a seal therewith, the element being movable in a direction transverse to the longitudinal direction between an open position wherein fluid flows through the orifice and a closed position wherein the element substantially shuts off fluid flow through the orifice;

wherein each orifice defines a maximum cross sectional area that is less than a cross-sectional area of the conduit.

7. The device of claim 6, further comprising a housing, wherein the inlet fluid conduits, outlet fluid conduit, orifices, and elements are at least partially positioned in the housing.

8. The device of claim 6, farther comprising:
a downstream orifice positioned along the outlet fluid conduit, the downstream orifice having at least one planar wall extending in a longitudinal direction of the outlet fluid conduit; and
a downstream element associated with the downstream orifice, the downstream element having a linear edge configured to mate with the at least one planar wall of the downstream orifice to form a seal therewith, the element being movable in a direction transverse to the longitudinal direction between an open position wherein fluid flows through the downstream orifice and a closed position wherein the downstream element substantially shuts off fluid flow through the downstream orifice.

9. The device of claim 6, further comprising a position sensor associated with each movable element and configured to generate a position signal indicative of a position of the movable element.

10. A device for metering fluid flow, comprising:
a housing;
a plurality of fluid inlet conduits in the housing, at least one of the fluid inlet conduits including a variable sized orifice, each variable sized orifice including an element movable in the fluid inlet conduit to vary a size of the variable sized orifice;
a single fluid outlet conduit coupled in fluid communication with the fluid inlet conduits;
a plurality of pressure sensors configured to determine a pressure differential across each variable sized orifice.

11. The device of claim 10, further comprising a positioning device associated with each variable sized orifice and configured to determine a position of the element relative to the fluid inlet conduit.

12. The device of claim 11, further comprising a processor configured to determine the fluid flow rate using pressure signals from the pressure sensors and position signals from the positioning devices.

13. The device of claim 10, further comprising a temperature sensor configured to determine a temperature of the fluid flowing in each of the fluid inlet conduits, wherein the determined temperatures are used to determine properties of the fluids in the fluid inlet conduits.

14. The device of claim 10, further comprising an outlet variable sized orifice positioned in the fluid outlet conduit, the outlet variable sized orifice including an element movable in the fluid outlet conduit to vary a size of the output variable sized orifice.

15. A flow device, comprising:
at least first and second input flow paths in fluid communication with a single output flow path;
a first variable sized orifice positioned in the first input flow path and a second variable sized orifice positioned in the second input flow path, each variable sized orifice including an orifice opening and an element movable in a direction transverse to fluid flowing through the orifice opening to change a size of the variable sized orifice;
a controller that receives inputs of a target total flow rate at the output flow path and a blend ratio of the volume of fluids from the first and second input flow paths present in the output flow path; and
a plurality of pressure sensors including a separate upstream pressure sensor positioned along each input flow path upstream of the variable sized orifices, and a first downstream pressure sensor positioned along the output flow path downstream of the variable sized orifices, the pressure sensors determining pressure differentials across each variable sized orifice;
wherein the controller controls a position of the movable elements of the first and second variable sized orifices in response to the target flow rate and blend ratio inputs.

16. The device of claim 15, further comprising an outlet variable sized orifice positioned along the output flow path, the output variable sized orifice including an orifice opening and an element movable in a direction transverse to fluid flowing through the orifice opening to change a size of the output variable sized orifice.

17. The device of claim 16, further comprising a pressure sensor positioned upstream of the output variable sized orifice and a downstream pressure sensor positioned downstream of the output variable sized orifice, the upstream and downstream pressure sensors configured to determine a pressure differential across the output variable sized orifice.

18. The device of claim 16, further comprising at least three input flow paths and at least two output flow paths.

19. A method of metering fluid flow through a flow blending device, the flow blending device including at least two input flow paths each carrying a fluid, a single output flow path in fluid communication with the at least two input flow paths, and a pressure sensing arrangement, each of the input flow paths including a variable orifice, the method comprising the steps of:
determining an orifice geometry defined by each variable orifice;
measuring a pressure differential across each variable orifice with the pressure sensing arrangement;
determining a fluid flow through each variable orifice using the measured pressure differentials and the determined orifice geometries; and
determining a first fluid flow through the output flow path using the determined fluid flow through each variable orifice;
wherein the flow blending device further includes a temperature sensor associated with each flow path, the method further comprising determining a temperature of the fluid in each flow path with the thermometers, the determined temperature used in determining fluid flow in through each variable orifice.

20. A method of metering fluid flow through a flow blending device, the flow blending device including at least two input flow paths each carrying a fluid, a single output flow path in fluid communication with the at least two input flow paths, and a pressure sensing arrangement, each of the input flow paths including a variable orifice, and the flow blending device comprises an output variable orifice in the output flow path, the method comprising the steps of:
determining an orifice geometry defined by each variable orifice;
measuring a pressure differential across each variable orifice with the pressure sensing arrangement;
determining a fluid flow through each variable orifice using the measured pressure differentials and the determined orifice geometries;
determining a first fluid flow through the output flow path using the determined fluid flow through each variable orifice;
determining a pressure differential across the output variable orifice with the pressure sensing arrangement;
determining an orifice geometry defined by the output variable orifice; and determining a second fluid flow through the output flow path using the determined geometry and pressure differential for the output variable orifice.

21. A device for controlling fluid flow, of the type having a variable orifice and configured to use a pressure signal, comprising:
   at least two inlet fluid conduits each having a circular cross section portion;
   a single outlet fluid conduit in fluid communication with each of the inlet fluid conduits
   a separate orifice positioned along a length of each inlet fluid conduit, each orifice having at least one planar wall extending in a longitudinal direction of the inlet fluid conduit;
   an element associated with each orifice, the element having a linear edge configured to mate with the at least one planar wall of the orifice to form a seal therewith, the element being movable in a direction transverse to the longitudinal direction between an open position wherein fluid flows through the orifice and a closed position wherein the element substantially shuts off fluid flow through the orifice; and
   a housing, wherein the inlet fluid conduits, outlet fluid conduit, orifices, and elements are at least partially positioned in the housing.

22. A device for controlling fluid flow, of the type having a variable orifice and configured to use a pressure signal, comprising:
   at least two inlet fluid conduits each having a circular cross section portion;
   a single outlet fluid conduit in fluid communication with each of the inlet fluid conduits
   a separate orifice positioned along a length of each inlet fluid conduit, each orifice having at least one planar wall extending in a longitudinal direction of the inlet fluid conduit;
   an element associated with each orifice, the element having a linear edge configured to mate with the at least one planar wall of the orifice to form a seal therewith, the element being movable in a direction transverse to the longitudinal direction between an open position wherein fluid flows through the orifice and a closed position wherein the element substantially shuts off fluid flow through the orifice; and
   a position sensor associated with each movable element and configured to generate a position signal indicative of a position of the movable element.

23. A flow device, comprising:
   at least first and second input flow paths in fluid communication with a single output flow path;
   a first variable sized orifice positioned in the first input flow path and a second variable sized orifice positioned in the second input flow path, each variable sized orifice including an orifice opening and an element movable in a direction transverse to fluid flowing through the orifice opening to change a size of the variable sized orifice;
   a controller that receives inputs of a target total flow rate at the output flow path and a blend ratio of the volume of fluids from the first and second input flow paths present in the output flow path;
   a outlet variable sized orifice positioned along the output flow path, the output variable sized orifice including an orifice opening and an element movable in a direction transverse to fluid flowing through the orifice opening to change a size of the output variable sized orifice; and
   a pressure sensor positioned upstream of the output variable sized orifice and a downstream pressure sensor positioned downstream of the output variable sized orifice, the upstream and downstream pressure sensors configured to determine a pressure differential across the output variable sized orifice;
   wherein the controller controls a position of the movable elements of the first and second variable sized orifices in response to the target flow rate and blend ratio inputs.

* * * * *

UNITED STATES PATENT AND TRADEMARK OFFICE
CERTIFICATE OF CORRECTION

PATENT NO. : 7,530,278 B2  Page 1 of 1
APPLICATION NO. : 11/592495
DATED : May 12, 2009
INVENTOR(S) : Litecky et al.

It is certified that error appears in the above-identified patent and that said Letters Patent is hereby corrected as shown below:

Col. 19, line 6, claim 8: "claim 6, farther comprising:" should read --claim 6, further comprising:--

Signed and Sealed this

Twenty-third Day of February, 2010

David J. Kappos
*Director of the United States Patent and Trademark Office*